(12) United States Patent
Hari et al.

(10) Patent No.: US 10,312,817 B2
(45) Date of Patent: Jun. 4, 2019

(54) SYSTEMS AND METHODS OF ACTIVE CLAMP FLYBACK POWER CONVERTERS

(71) Applicant: SEMICONDUCTOR COMPONENTS INDUSTRIES, LLC, Phoenix, AZ (US)

(72) Inventors: Ajay Karthik Hari, Scottsdale, AZ (US); Bryan Wayne McCoy, Chandler, AZ (US)

(73) Assignee: SEMICONDUCTOR COMPONENTS INDUSTRIES, LLC, Pheonix, AZ (US)

( * ) Notice: Subject to any disclaimer, the term of this patent is extended or adjusted under 35 U.S.C. 154(b) by 0 days.

(21) Appl. No.: 15/964,620

(22) Filed: Apr. 27, 2018

(65) Prior Publication Data

US 2019/0013739 A1    Jan. 10, 2019

Related U.S. Application Data

(60) Provisional application No. 62/529,613, filed on Jul. 7, 2017.

(51) Int. Cl.
*H02M 3/335* (2006.01)
*H02M 1/34* (2007.01)

(52) U.S. Cl.
CPC ......... *H02M 3/33515* (2013.01); *H02M 1/34* (2013.01); *H02M 3/33569* (2013.01); *H02M 3/33592* (2013.01); *H02M 2001/342* (2013.01)

(58) Field of Classification Search
CPC ...... H02M 3/33507; H02M 1/08; H02M 1/32; H02M 2001/0009; H02M 3/33515; H02M 3/33592; H02M 3/33569; H02M 1/34; H02M 2001/342
See application file for complete search history.

(56) References Cited

U.S. PATENT DOCUMENTS

| 6,069,803 | A | * | 5/2000 | Cross | H02M 3/33569 |
| | | | | | 363/21.14 |
| 9,614,447 | B2 | | 4/2017 | Liu | |
| 9,893,636 | B2 | * | 2/2018 | Phadke | H02M 3/33546 |
| 9,935,556 | B1 | * | 4/2018 | Rana | H02M 3/33507 |
| 9,991,803 | B1 | * | 6/2018 | Wang | H02M 3/33507 |
| 2017/0207708 | A1 | | 7/2017 | Hari et al. | |
| 2017/0264206 | A1 | * | 9/2017 | Rana | H02M 3/33569 |
| 2018/0102709 | A1 | * | 4/2018 | Hari | H02M 3/33523 |

* cited by examiner

*Primary Examiner* — Kyle J Moody
(74) *Attorney, Agent, or Firm* — Dickinson Wright PLLC

(57) ABSTRACT

Active clamp flyback power converter. At least some of the example embodiments are methods including: activating a main FET and thereby inducing positive current flow in a primary winding, the positive current flow resulting in reverse biasing of a rectifier of a secondary circuit; deactivating the main FET and thereby forward biasing the rectifier in the secondary circuit and causing current flow in the secondary winding; activating a clamp FET and thereby coupling a clamp capacitor to a leakage inductance of a transformer, the primary circuit having initially a positive current flow through the primary winding and then a negative current flow through the primary winding; and regulating the negative current flow through the primary winding.

19 Claims, 11 Drawing Sheets

SYSTEMS AND METHODS OF ACTIVE CLAMP FLYBACK POWER CONVERTERS

CROSS-REFERENCE TO RELATED APPLICATIONS

This application claims benefit of provisional application Ser. No. 62/529,613 filed Jul. 7, 2017, and titled "Variable Frequency In Active Clamp Flyback Converter for Variable Output Voltage." The provisional application is incorporated by reference herein as if reproduced in full below.

BACKGROUND

One related-art power converter topology is the active clamp flyback (ACF) power converter. ACF power converters, which appeared in literature starting in the mid-1990s, use a resonant or quasi-resonant primary circuit that operates in a constant conduction mode (CCM). ACF power converters can achieve high efficiency at high loads. However, ACF power converters have not been widely used because the CCM operation in the primary circuit results in high magnetizing and core losses during low power and standby modes. That is, ACF power converters have difficulty passing regulatory requirements for standby power usage. For example, regulatory standby power limits may be 75-150 milliwatts depending on the jurisdiction, while the CCM operation in the primary circuit of an ACF power converter may consume standby power on the order of one to two watts.

BRIEF DESCRIPTION OF THE DRAWINGS

For a detailed description of example embodiments, reference will now be made to the accompanying drawings in which.

DEFINITIONS

Figure 1:
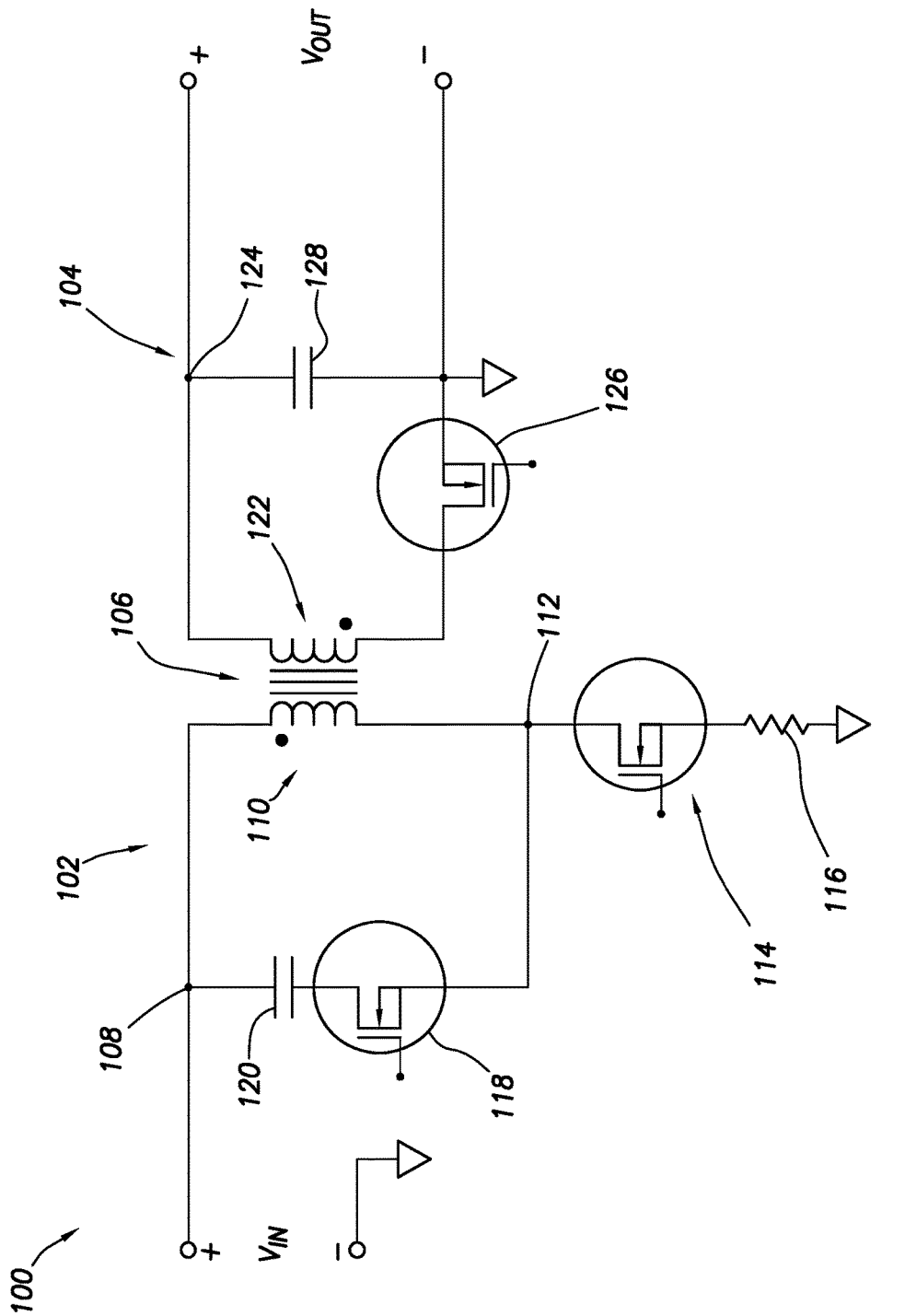
FIG. 1 shows a simplified schematic diagram of an active clamp flyback power converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Activating a timer" shall mean starting a timer, whether the timer counts up or down.

"Expiration of a timer" shall mean the timer value reaches an end value. The end value may be zero for timers that count down, and the end value may be a predetermined non-zero value for timers that count up.

The terms "input" and "output" when used as nouns refer to connections (e.g., electrical, software), and shall not be read as verbs requiring action. For example, an oscillator circuit on a substrate may define a clock output. The example oscillator circuit may create or drive a clock signal on the clock output. In systems implemented directly in hardware (e.g., on a semiconductor substrate), these "inputs" and "outputs" define electrical connections. In systems implemented in software these "inputs" and "outputs" define parameters read by or written by, respectively, the instructions implementing the function.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to systems and methods of active clamp flyback power converters. More particularly, the primary circuit in an active clamp flyback power converter implements both: positive current through the primary winding of a transformer when the main field effect transistor (FET) is conducting; and negative current through the primary winding (opposite the positive current) during a period of time after the main FET stops conducting. Various example embodiments are directed to regulating the negative current through the primary winding to balance considerations of reducing conduction and core losses in the transformer (particularly at lower loads), yet still achieving sufficient negative current to implement zero-volt switching (ZVS) of the main FET of the primary circuit. More particularly still, example embodiments are directed to monitoring electrical current (or a signal indicative of electrical current) in the primary circuit of the switching power supply, and changing frequency of a clock signal responsive to the electrical current in the primary circuit. When the negative current is too high, the clock frequency is increased (e.g., by a fixed amount, or by an amount proportional to how much the negative current is above a predetermined threshold). Oppositely, when the negative current is too low, the clock frequency is decreased (e.g., by a fixed amount, or by an amount proportional to how much the negative current is below a predetermined threshold). The specification first turns to an example active clamp flyback power converter, and its operation, to orient the reader.

FIG. 1 shows a simplified schematic diagram of an active clamp flyback power converter in accordance with at least some embodiments. In particular, the power converter 100 comprises a primary circuit 102 electrically coupled to a secondary circuit 104 by way of a flyback transformer 106. The primary circuit 102 defines a node 108 that couples to a direct current (DC) input voltage $V_{IN}$. In the example system the node 108 also couples directly to a first lead of a primary winding 110 of the flyback transformer 106. The second lead of the primary winding 110 couples to switch node 112. The switch node 112 (and thus the second lead of the primary winding 110) couples to a drain of a main FET 114. The source of the main FET 114 couples to common or ground by way of an optional sense resistor 116. The switch node 112 also couples to the source of a clamp FET 118. The drain of the clamp FET 118 couples to one lead of a clamp capacitor 120, and the second lead of the clamp capacitor 120 couples to the node 108. In example systems the main FET 114 and the clamp FET 118 are N-channel metal oxide semiconductor (MOS) FETs. However, in other example cases the main FET 114 and clamp FET 118 may be P-channel MOSFETs, or any other suitable device that operates as an electrically controlled switch, including FETs referred to as "super-junction" (SJFETs), and higher performance gallium nitride (GaN) FETs. Alternatively, the active clamp circuit, combination of clamp switch and capacitor can also be referenced to ground (GND) instead of input voltage to the power converter.

The example secondary circuit 104 comprises a secondary winding 122 of the flyback transformer 106. A first lead of the secondary winding 122 couples to an output node 124 of the secondary circuit 104 and thus the positive terminal of $V_{OUT}$. The second lead of the secondary winding 122 couples to a rectifier in the example form a FET 126. In particular, the second lead of the secondary winding 122 couples to the drain of FET 126, and the source of FET 126 couples to common or ground for the secondary circuit 104. In other example cases, the rectifier in the secondary circuit may be passive element, such as a diode. The secondary circuit 104 also comprises a capacitor 128 coupled between the output node 124 and common or ground for the secondary circuit 104 (which need not be the same as the common or ground for the primary circuit 102 because of the isolation aspects of the flyback transformer 106). The specification now turns to various operational states or modes of the power converter 100.

Figure 2A:
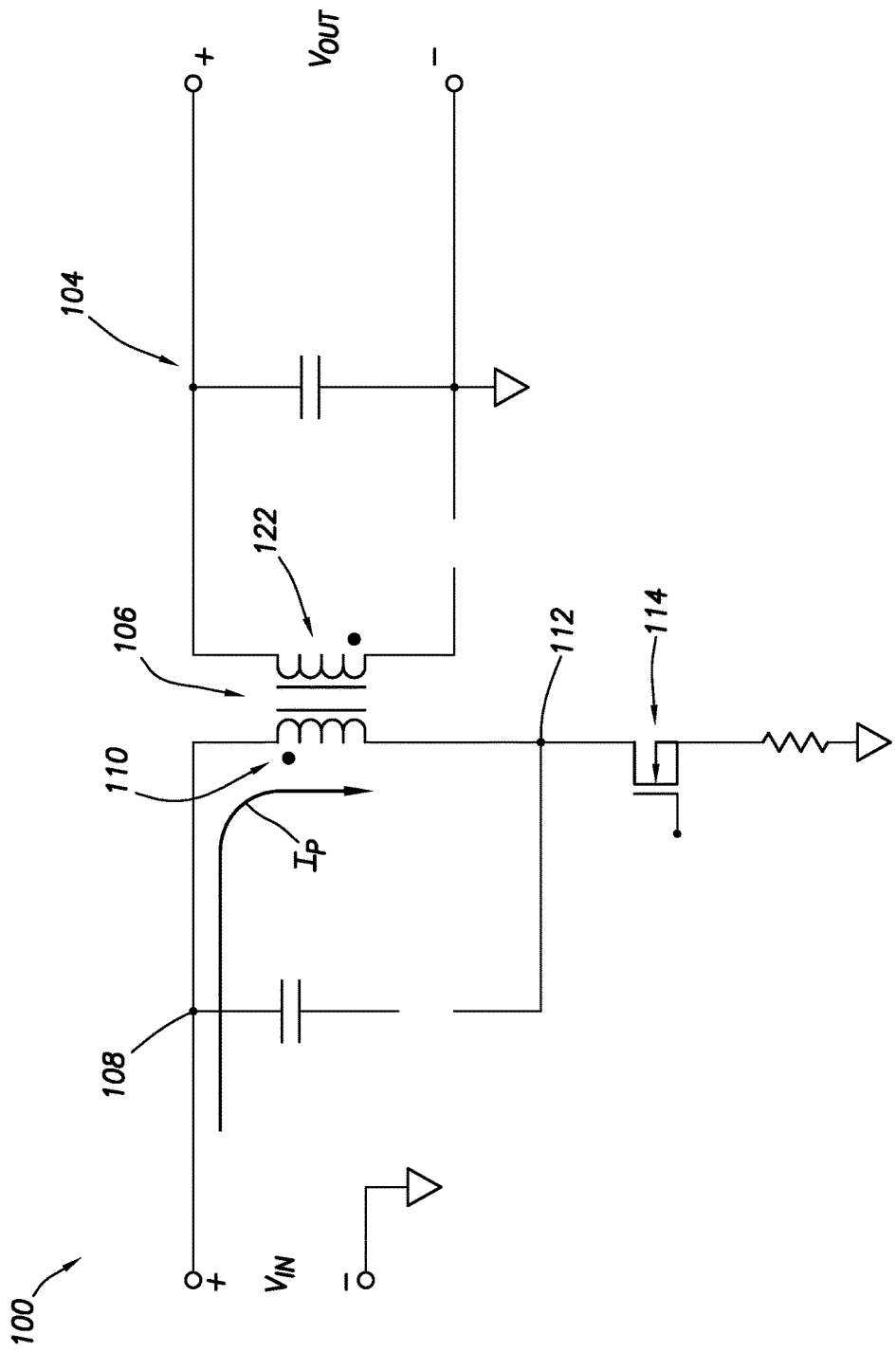
FIG. 2A shows a schematic diagram of a first mode of operation of the power converter in accordance with at least some embodiments.

FIG. 2A shows a schematic diagram of a first mode of operation of the power converter 100 in accordance with at least some embodiments. In particular, the FETs that are active (i.e., conductive) are present in the figure, and the FETs that are inactive (i.e., non-conductive) are removed to show an open circuit. During the first mode, or energy storage mode, the main FET 114 is conductive, and thus electrical current $I_P$ flows from the voltage source $V_{IN}$, through node 108, through the primary winding 110, through the switch node 112, and through the main FET 114 to common or ground. The electrical current $I_P$ flowing in the direction shown through the primary winding 110 is referred to as positive current flow. The positive current flow $I_P$ creates a voltage on the secondary winding 122 that reverse biases the rectifier in the secondary circuit 104, which in the energy storage mode is non-conductive (as indicated in the figure). Thus, the positive current flow $I_P$ stores energy in the field of the flyback transformer 106. At some point, controlled by the output voltage $V_{OUT}$ (the control discussed more below), the energy storage mode ends by deactivating the main FET 114, as shown in FIG. 2B.

Figure 2B:
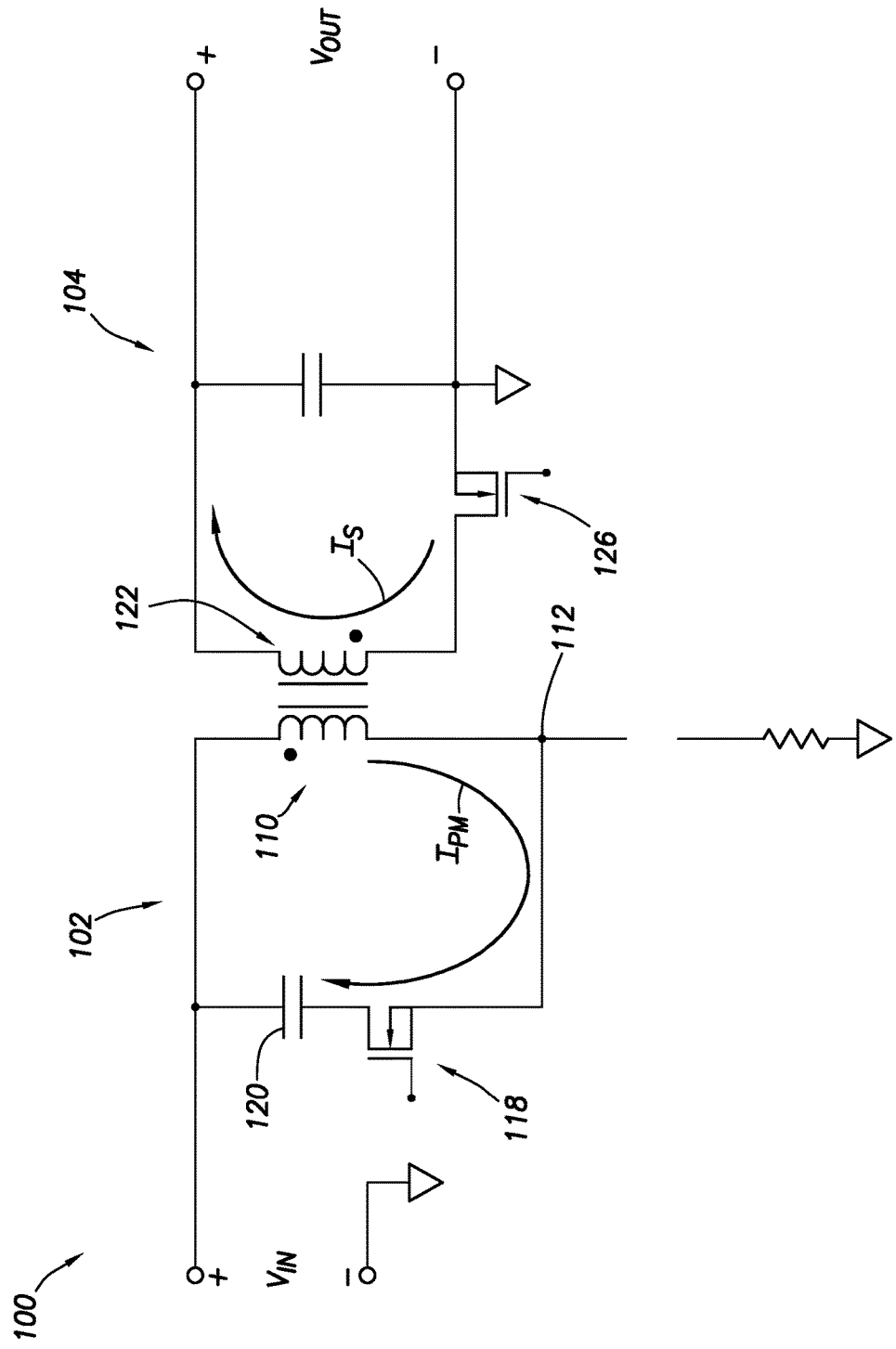
FIG. 2B shows a schematic diagram of a second mode of operation of the power converter in accordance with at least some embodiments.

FIG. 2B shows a schematic diagram of a second mode of operation of the power converter 100 in accordance with at least some embodiments. As before, the FETs that are conductive are shown in the figure, and FETs that are non-conductive are removed to show an open circuit. During the second mode, or flyback mode, the main FET 114 (not shown) is non-conductive, but the clamp FET 118 is conductive during at least a portion of the flyback mode. Because of the inductance of the primary winding 110, the positive current flow from the energy storage mode cannot stop immediately when the main FET 114 (not shown) is deactivated, and thus a positive current $I_{PM}$ (in particular, the electrical current associated with the magnetizing inductance (discussed more below)) continues to flow in the primary circuit 102 through the switch node 112, the clamp FET 118, and the clamp capacitor 120. At the same time, the energy stored in the field of the flyback transformer 106 collapses, which creates a voltage on the secondary winding 122 that forward biases the rectifier in the secondary circuit 104. Either based on being forward biased (for passive rectifiers), or because the rectifier in the form of FET 126 is activated (or both), secondary current $I_S$ flows in the secondary circuit 104 as shown, providing the output voltage $V_{OUT}$ and providing power to the load (not specifically shown).

Figure 2C:
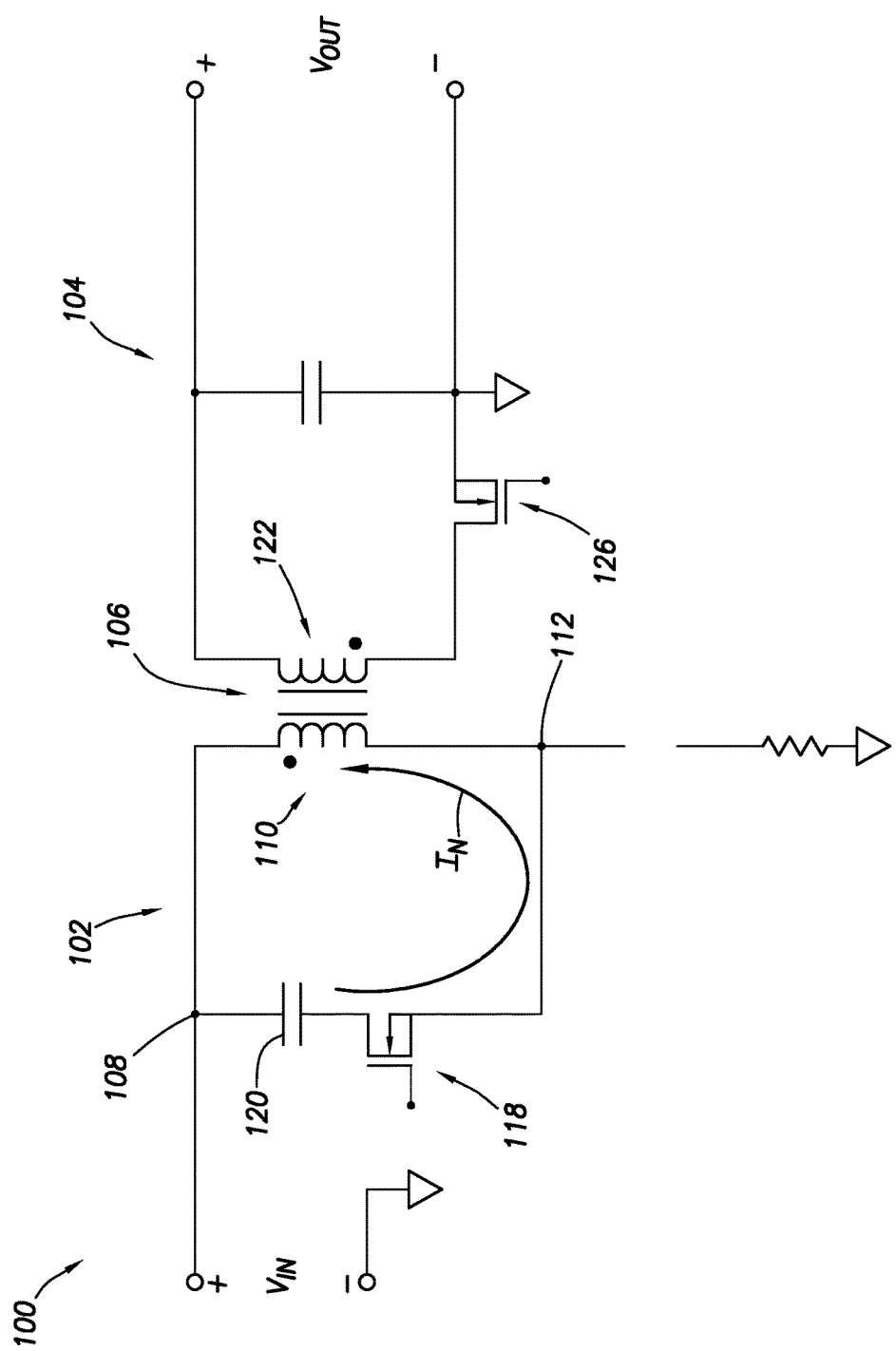
FIG. 2C shows a schematic diagram of a third mode of operation of the power converter in accordance with at least some embodiments.

The capacitance of the primary circuit 102, including the clamp capacitor 120 and various parasitic capacitances discussed more below, forms a tank circuit with the leakage inductance of the primary winding 110. Thus, depending on the respective capacitances and the leakage inductance, the electrical current in the primary circuit 102 may resonate or oscillate. FIG. 2C shows a schematic diagram of a third mode of operation of the power converter 100 in accordance with at least some embodiments. As before, the FETs that are conductive are shown in the figure, and the FETs that are non-conductive are removed to show an open circuit. During the third mode, or resonant energy transfer mode, the main FET 114 (not shown) is still non-conductive, and the clamp FET 118 is still conductive. However, because of the resonance between the various capacitances (particularly the clamp capacitor) and the leakage inductance, the electrical current in the primary circuit 102 reverses direction and becomes a negative current $I_N$ that flows through the switch node 112 and the primary winding 110. In some active clamp flyback power converters, the resonance of the primary circuit 102 may result in multiple oscillations of the electrical current in the primary circuit 102. In some cases, the negative current $I_N$ through the primary winding 110 contributes to additional induced current and voltage in the secondary winding 122. Moreover, depending on the load and the frequency of operation, the resonant energy transfer mode may overlap, in time, the flyback mode discussed with respect to FIG. 2B. However, in accordance with at least some embodiments the power converter 100 is operated such that soon after the negative current $I_N$ begins to flow, the clamp FET 118 is turned off, as discussed with respect to FIG. 2D.

Figure 2D:
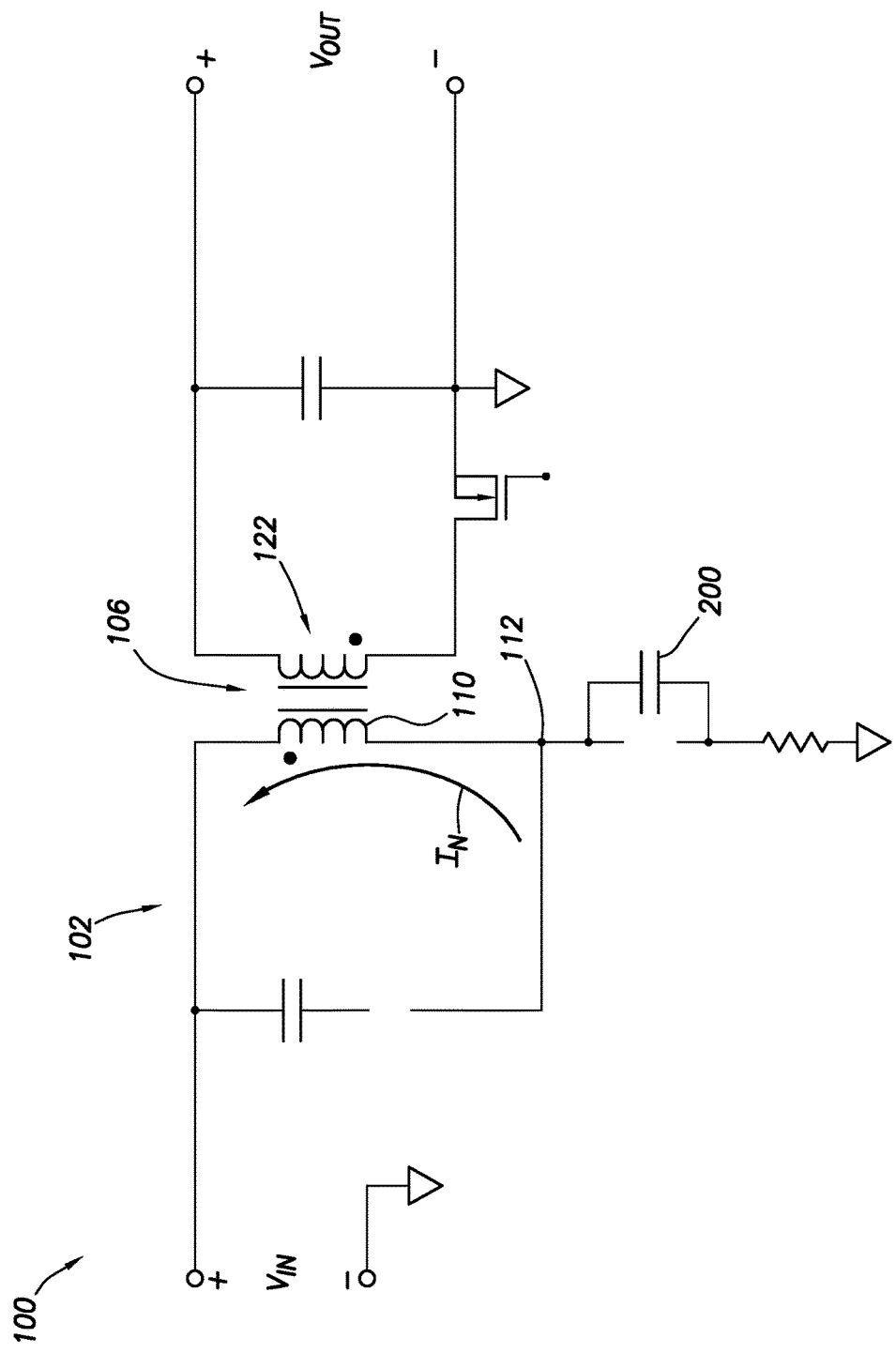
FIG. 2D shows a schematic diagram of a fourth mode of operation of the power converter in accordance with at least some embodiments.

FIG. 2D shows a schematic diagram of a fourth mode of operation of the power converter 100 in accordance with at least some embodiments. As before, the FETs that are conductive are shown in the figure, and FETs that are non-conductive are removed to show an open circuit. During the fourth mode, the main FET 114 (not shown) is still non-conductive, and the clamp FET 118 (not shown) is non-conductive. Again because of the inductance of the primary winding 110, the negative current flow (from the resonant energy transfer mode) cannot stop immediately when the clamp FET 118 (not shown) is deactivated, and thus the negative current $I_N$ continues to flow in the primary winding 110. The negative current $I_N$ causes the voltage at the switch node 112 to become negative. In accordance with example embodiments, the negative current $I_N$ discharges the parasitic capacitance in the primary circuit 102, such as the parasitic capacitance associated with the main FET 114 (not shown), the parasitic capacitance illustrated as capacitor 200. When the voltage across the main FET 114 is approximately zero volts, the power converter 100 again activates the main FET 114, and the cycle starts again with the energy storage mode of FIG. 2A.

Related-art active clamp power converters use a fixed frequency of operation regardless of the amount of power provided to the load coupled to the secondary circuit 104. It is noted that some related-art active clamp power converters change frequency to account for changes in input voltage $V_{IN}$, such as described in co-owned and commonly assigned application Ser. No. 15/156,033 filed May 16, 2017 titled "Power Conversion Efficiency Using Variable Switching Frequency," which application is incorporated by reference herein as if reproduced in full below. However, the inventors of the present specification have found that using a fixed clock frequency (for constant input voltage $V_{IN}$) in spite of changes in load results in inefficiency of the active clamp flyback power converters at lower loads.

Figure 3:
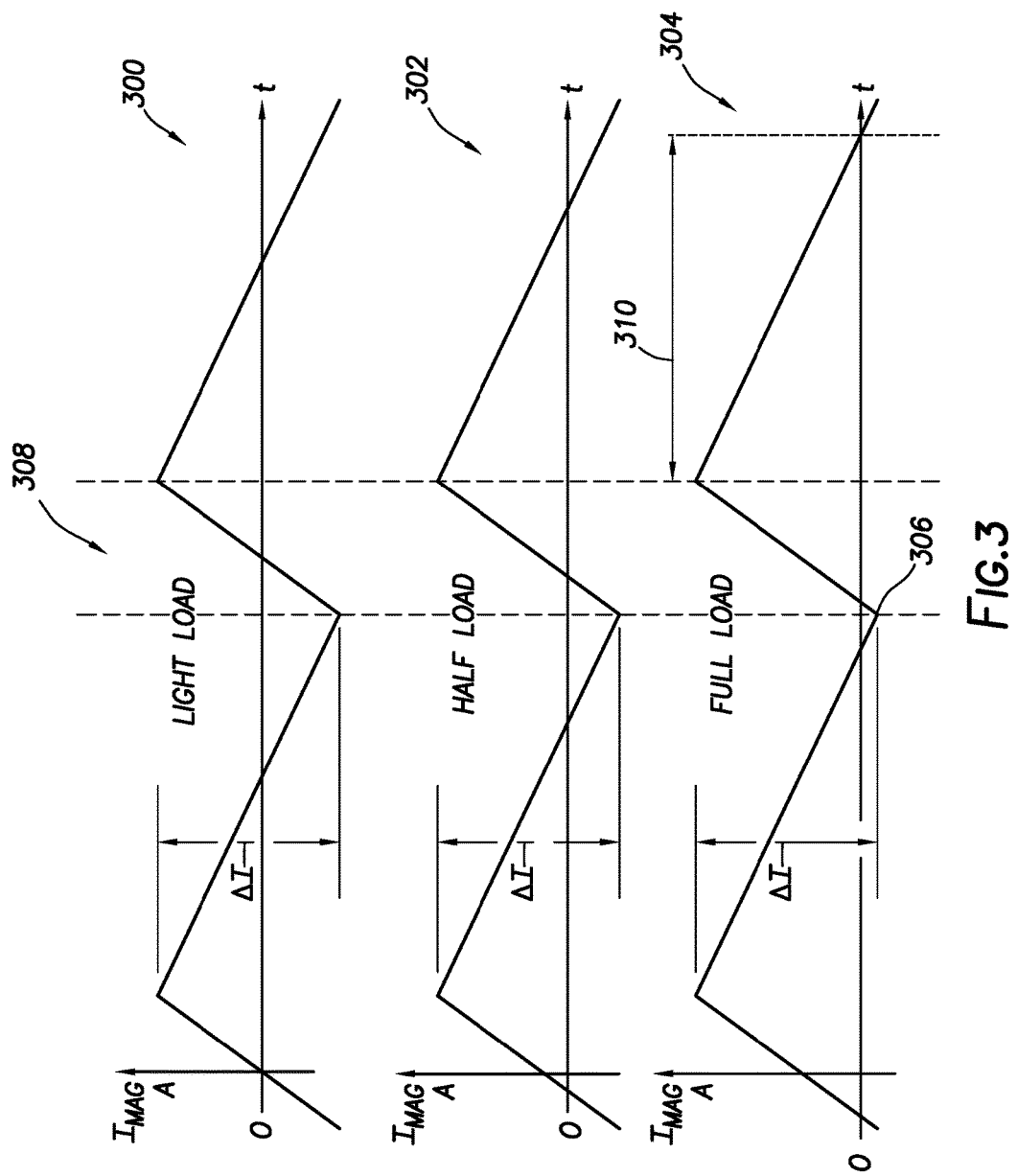
FIG. 3 shows a set of plots electrical current through the switch node as a function of time.

FIG. 3 shows a set of plots of electrical current through the switch node 112 as a function of time. In particular, plot 300 shows the electrical current through the switch node 112 in light-load conditions. Plot 302 shows the electrical current through the switch node 112 in half-load conditions. Plot 304 shows the electrical current through the switch node 112 in full-load conditions. Starting with the full-load plot 304. As discussed above, in accordance with the example embodiment the power converter 100 (FIG. 1) is controlled such that the electrical current through the switch node 112 becomes a negative current which discharges parasitic capacitances in the primary circuit 102, such as the parasitic capacitance represented by capacitor 200 (FIG. 2D). The negative current is shown in the full-load plot 304 as the small triangular region 306. Once the parasitic capacitance is discharged, the power converter 100 enters the energy storage mode by activating the main FET 114 (FIG. 1, and FIG. 2A), with one example energy storage mode shown in all three plots as time span 308. For a particular clock frequency of an oscillator that defines timing within the power converter 100 (the oscillator and timing discussed more below), in a steady state condition the particular clock frequency enables sufficient negative current flow to discharge the parasitic capacitance within the primary circuit 102 to ensure zero-volt switching of the main FET 114. However, as shown with respect to the light-load plot 300 and the half-load plot 302, that same particular clock frequency results in relative constant peak-to-peak current flow in the primary circuit 102 (shown by ΔI in the plots). While the constant ΔI electrical current results in good zero-volt switching at full load, the same particular clock frequency and constant ΔI current results in excessive negative current at light load and half load. The excessive negative current decreases efficiency of the power converter by increasing conduction and core losses.

In accordance with example embodiments, the active clamp flyback power converter 100 regulates negative current flow through the primary winding 110 (or equivalently stated, through the switch node 112). More particularly, example embodiments change the clock frequency of an oscillator providing a clock signal to de-activate the clamp FET 118, the change in clock frequency responsive to a negative current flow through the primary winding 110 (or switch node 112). For example, if the negative current is too high, the clock frequency of the oscillator increases. And if the negative current is too low (e.g., such that zero-volt switching cannot take place), the clock frequency of the oscillator decreases. The result is that clock frequency changes with load.

Figure 4:
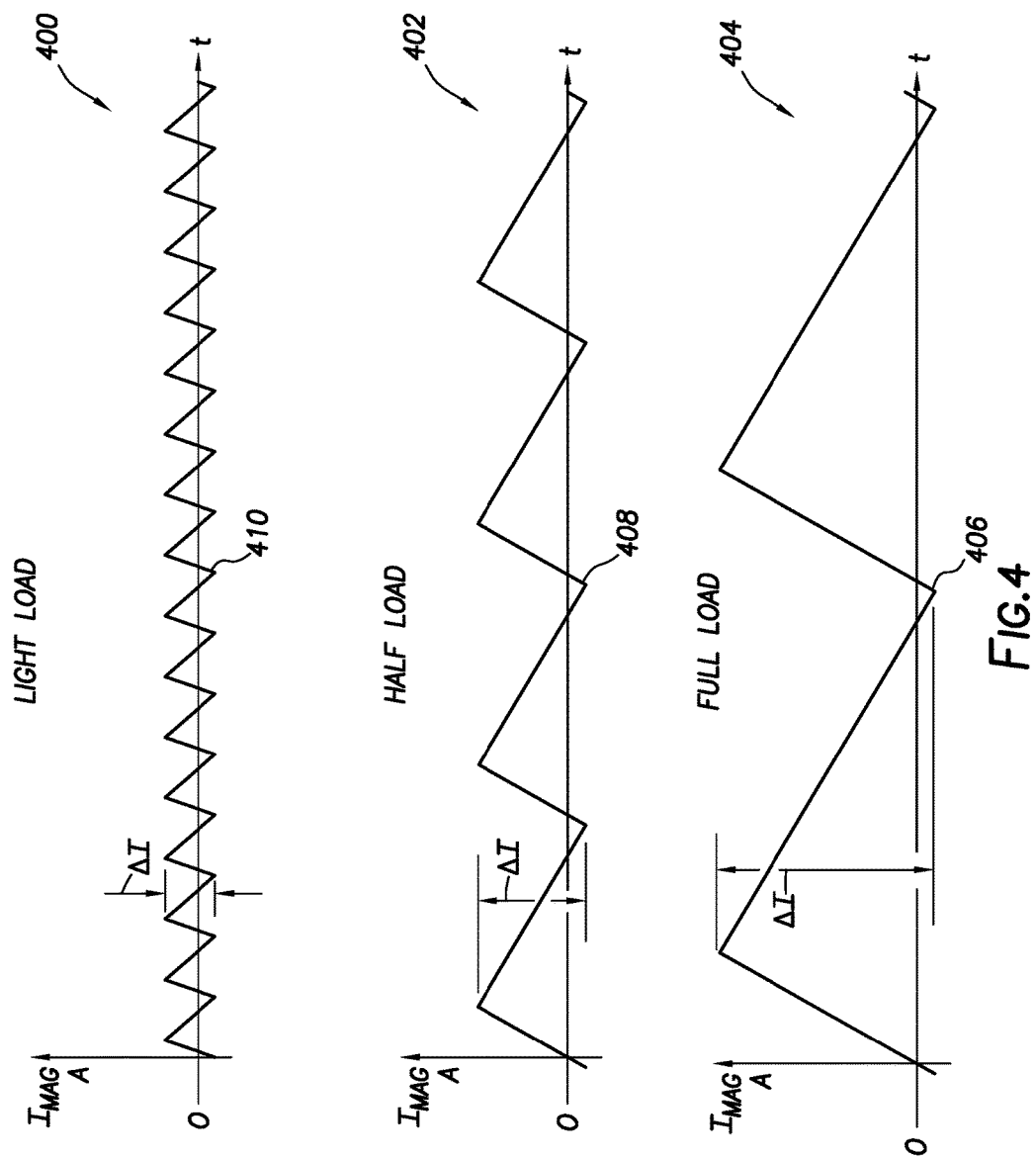
FIG. 4 shows a set of plots electrical current through the switch node as a function of time in accordance with at least some embodiments.

FIG. 4 shows a set of plots of electrical current through the switch node 112 as a function of time in accordance with at least some embodiments. In particular, plot 400 shows the electrical current through the switch node 112 in light-load conditions. Plot 402 shows the electrical current through the switch node 112 in half-load conditions. Plot 404 shows the electrical current through the switch node 112 in full-load conditions. Starting with the full-load plot 404, as discussed above, the negative current is shown in the full-load plot 404 as the small triangular region 406. As the load decreases, so too does the clock frequency of the oscillator. Referring to the half-load plot 402, the negative current is shown in the half-load plot 402 as the small triangular region 408. In steady-state operation, the peak negative current represented by the triangular region 408 is the same as the peak negative current represented by triangular region 406. Moving between full load and half load, the clock frequency of the oscillator is changed, and particularly the clock frequency is increased. As the load further decreases, the clock frequency continues to increase. Referring to the light-load plot 400, the negative current is shown in the light-load plot 400 as the small triangular region 410. In steady-state operation, the peak negative current represented by the triangular region 410 is the same as the peak negative current represented by triangular region 408 and triangular region 406, and to achieve the steady-state operation the clock frequency of the oscillator is increased. Stated with respect to opposite loading changes, as the load changes from light loads to heavy loads, the clock frequency of the oscillator changes from higher frequency to lower frequency, respectively. Stated slightly differently again, the peak-to-peak current flow ΔI in the primary circuit 102 changes as function of load, with increasing ΔI with increasing load, and decreasing ΔI with decreasing load.

Figure 5:
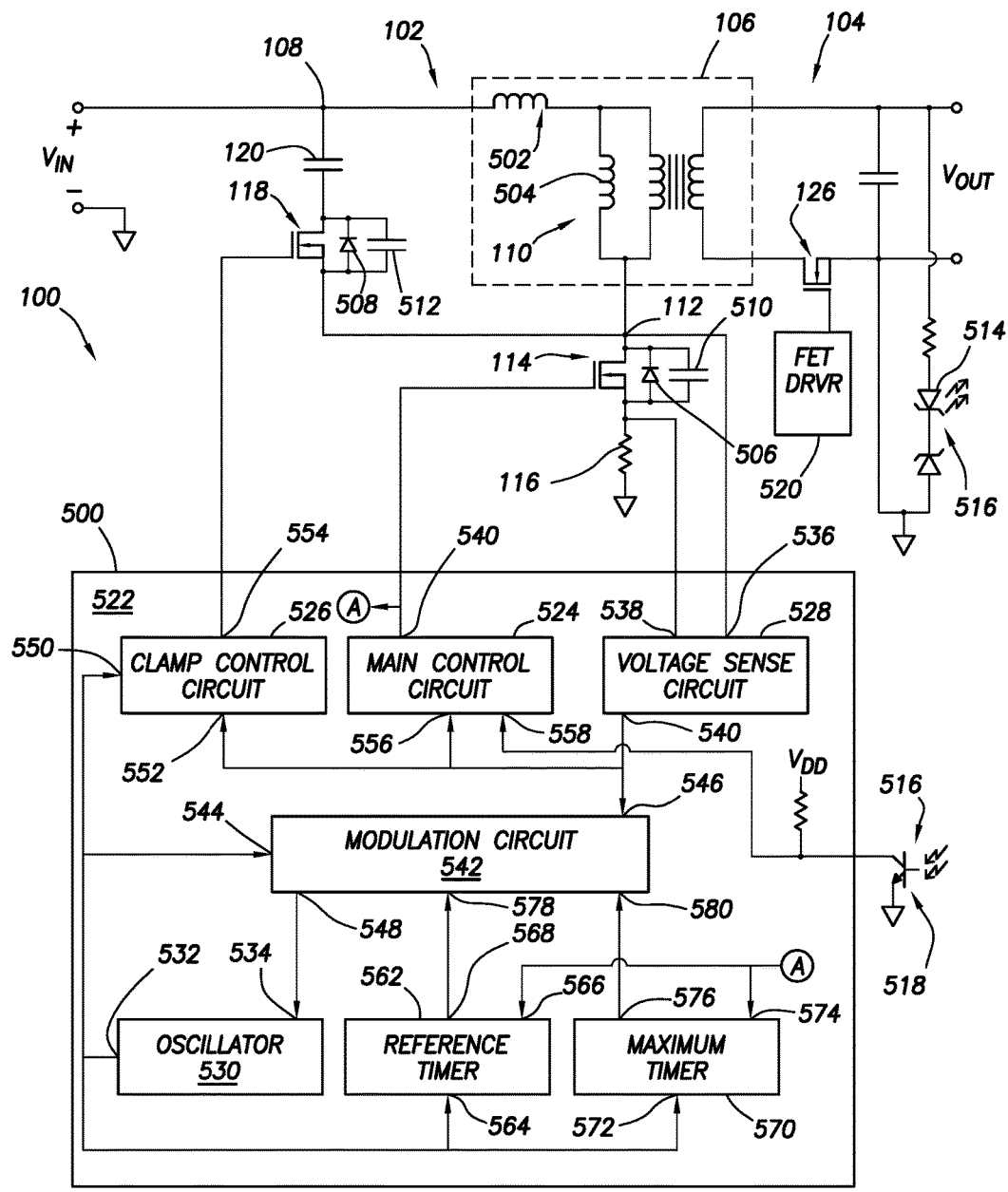
FIG. 5 shows a more detailed schematic of an active clamp power converter, including a block diagram of a controller, in accordance with at least some embodiments.

FIG. 5 shows a more detailed schematic of an active clamp power converter, including a block diagram of a controller 500, in accordance with at least some embodiments. In particular, the power converter 100 comprises the primary circuit 102 coupled to the secondary circuit 104 by way of the flyback transformer 106. The flyback transformer 106 is shown in a model or equivalent circuit from where the primary winding 110 is modelled as a leakage inductance 502 in series with a magnetizing inductance 504, and the magnetizing inductance 504 in parallel with the primary winding of an ideal (lossless) transformer. As before, one lead of the primary side of the flyback transformer 106 is coupled to the node 108, and the second lead of the primary side of the flyback transformer 106 is coupled to the switch node 112. The main FET 114, clamp FET 118, and clamp capacitor 120 are coupled as discussed with respect to the previous figures. However, also shown in FIG. 5 is the body diode 506 of the main FET 114, and the body diode 508 of the clamp FET 118. Further, each FET is shown with a capacitor representing the parasitic capacitance of the device. Thus, capacitor 510 is shown coupled across the main FET 114, and capacitor 512 is shown coupled across the clamp FET 118.

Additional components are also shown within the secondary circuit 104. In particular, in order to provide an indication of output voltage to the controller 500, the light emitting diode (LED) 514 of an optocoupler 516 is coupled to the output voltage $V_{OUT}$. The optically driven transistor 518 portion of the optocoupler 516 is coupled to the controller 500. The FET 126 in the secondary circuit 104, operating as a synchronous rectifier, is coupled to a FET driver 520. The FET driver 520 may be any suitable secondary side synchronous rectifier driver/controller, such as a part number NCP4305 secondary side synchronous rectifier driver available from ON Semiconductor of Phoenix, Ariz.

The controller 500 comprises a semiconductor substrate 522 upon which various circuits are constructed. The semiconductor substrate 522 of the controller 500 may be packaged in any suitable form, such as a 16 pin dual in-line (DIP) package. The example circuits implemented on the semiconductor substrate 522 may take any suitable form. For example, some of the functions may be implemented using individual circuit components (e.g., transistors, capacitors, resistors, etc.) arranged to fulfill the function. In other cases, the functions may be implemented as instructions executed in one or more processor cores defined on the semiconductor substrate 522. In yet still other cases, the functions may be implemented in part by individual circuit components, and in part by instructions executed by processor cores.

Still referring to FIG. 5, the gate of the main FET 114 is coupled to the controller 500, and more particularly is coupled to the main control circuit 524. Similarly, the gate of the clamp FET 118 is coupled to the controller 500, and more particularly is coupled to the clamp control circuit 526. As alluded to above, the transistor 518 of the optocoupler 516 is coupled to the controller 500, and more particularly is coupled to the main control circuit 524.

The discussion of operation of the power converter 100 with respect to FIGS. 1 and 2A-2D was with respect to the electrical current flowing in primary circuit 102. In example embodiments, the controller 500 operates by sensing a signal indicative of current flow through the primary winding 110 of the flyback transformer 106 (or equivalently, a signal indicative of current flow through the switch node 112), hereafter just "a signal indicative of current flow." In some cases, the signal indicative of current flow may be a direct measurement of current flow (e.g., a current transformer coupled within the primary circuit 102, a sense resistance in series in the primary circuit 102). However, in other embodiments the signal indicative of current flow may be voltage from which the underlying electrical current can be inferred. In the example embodiment of FIG. 5, controller 500 has a voltage sense circuit 528 defined on the semiconductor substrate 522, and the voltage sense circuit 528 couples to the switch node 112, where voltage on the switch node 112 is a signal indicative of current flow through the primary winding 110. The example voltage sense circuit 528 also illustrates an optional coupling to the node between the main FET 114 and the sense resistor 116. At certain points in time (e.g., when the voltage on the switch node 112 is negative and thus the body diode 506 is forward biased), the voltage at the node between the main FET 114 and the sense resistor 116 is also a signal indicative of current flow. Example uses of the voltage sensed on the sense resistor 116 are discussed more below.

The example controller 500 comprises several circuits that work together to implement overall control of the power converter 100, as well as regulation of the negative current in the primary circuit 102 of the power converter 100. In particular, the controller 500 includes an oscillator 530 defined on the semiconductor substrate 522. The oscillator 530 defines a clock output 532 and a modulate input 534. The oscillator 530 is configured to generate a clock signal at a clock frequency on the clock output 532 based on a modulate signal received on the modulate input 534. The example controller further includes the voltage sense circuit 528 defined on the semiconductor substrate 522. The voltage sense circuit 528 defines a first sense input 536, a second sense input 538 that is optional, and a sense output 540. The first sense input 536 is coupled to the switch node 112 as discussed above. The voltage sense circuit 528 is configured to sense the signal indicative of current flow by way of the first sense input 536. The second sense input 538 (when present) couples to the node between the sense resistor 116 and the main FET 114. The voltage sense circuit 528 is configured to sense a voltage indicative of current flow by way of the second sense input 538. The example voltage sense circuit 528 generates, on the sense output 540, a sense signal (that is indicative of current through the primary winding). In some cases, the voltages in the primary circuit 102 may be several hundred volts (particularly during the flyback mode), and thus the voltage sense circuit 528 may generate the sense signal on the sense output 540 to be a scaled version of the voltage on the first sense input 536.

The example controller 500 further includes a modulation circuit 542 defined on the semiconductor substrate 522. The modulation circuit 542 defines a clock input 544, a sense input 546, and a modulate output 548. The clock input 544 is coupled to the clock output 532 of the oscillator 530, and is thus coupled to the clock signal. The sense input 546 is coupled to the sense output 540 of the voltage sense circuit 528, and is thus coupled to the sense signal. The modulate output 548 is coupled to the modulate input 534 of the oscillator 530. Discussion of operation of the modulation circuit continues after introduction of the remaining components of the controller 500.

The example controller 500 further includes the clamp control circuit 526 defined on the semiconductor substrate 522. The clamp control circuit 526 defines a clock input 550, a sense input 552, and a clamp drive output 554. The clock input 550 is coupled to the clock output 532 of the oscillator 530, and thus is coupled to the clock signal. The sense input 552 of the clamp control circuit 526 is coupled to the sense output 540 of the voltage sense circuit 528, and thus is coupled to the sense signal. The clamp drive output 554 is coupled to the gate of the clamp FET 118.

The example clamp control circuit 526 is configured to assert the clamp drive output 554 responsive to the sense signal received on the sense input 552 (and thus make the clamp FET 118 conductive) rising through a second predetermined threshold (after the main drive output 560 is de-asserted). In accordance with at least some embodiments, the second predetermined voltage is a non-zero voltage threshold that indicates that a zero-volt switching condition for the clamp FET 118 will occur soon thereafter. The example clamp control circuit 526 is further configured to de-assert the clamp drive output 554 responsive to assertion of the clock input 550 (i.e., assertion of the clock signal).

The example controller 500 further includes the main control circuit 524 defined on the semiconductor substrate 522. The main control circuit 524 defines a sense input 556, a feedback input 558, and a main drive output 560. The sense input 556 of the main control circuit 524 is coupled to the sense output 540 of the voltage sense circuit 528, and thus is coupled to the sense signal. The feedback input 558 is coupled to a feedback signal from a secondary circuit 104 of the power converter. In the example system, the feedback input 558 is coupled to the transistors 518 of the optocoupler 516, and thus receives an indication of the output voltage $V_{OUT}$ of the secondary circuit 104. The main drive output 560 is coupled to the gate of a main FET 114.

In accordance with the example embodiment, the main control circuit 524 is configured to assert the main drive output 560 (and thus make the main FET 114 conductive) responsive to the sense signal on the sense input 556. The example main control circuit 524 is also configured to de-assert the main drive output 560 based on the feedback signal received on the feedback input 558.

The example modulation circuit 542 is configured to monitor the sense signal (which is proportional to a signal indicative of negative current) received on the sense input 546. Moreover, the modulation circuit 542 is configured to regulate the clock frequency of the clock signal by changing the modulate signal driven to the modulate output 548 based on the sense signal. For example, the modulation circuit 542 is configured to increase the frequency of the clock signal if the sense signal indicates excess negative current. Conversely, the modulation circuit 542 is configured to decrease the frequency of the clock signal if the sense signal indicates insufficient negative current.

Figure 6:
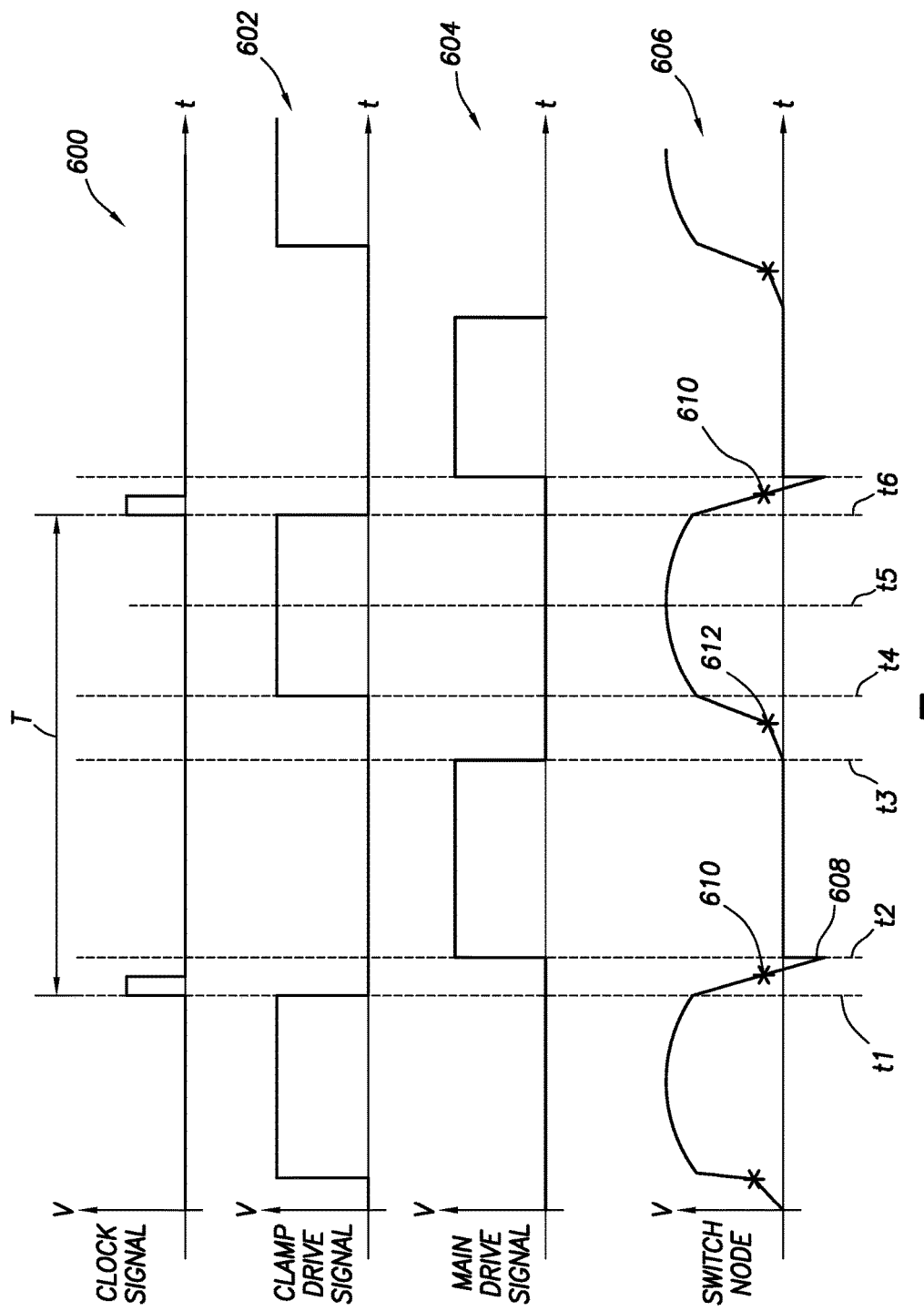
FIG. 6 shows a timing diagram with various signals in accordance with at least some embodiments.

FIG. 6 shows a timing diagram with various signals in accordance with at least some embodiments. In particular, plot 600 shows a clock signal voltage as a function of time, plot 602 a clamp drive signal as a function of time, plot 604 shows a main drive signal as a function of time, and plot 606 shows switch node voltage as a function of time. The various plots 600-606 are shown stacked so that the time axis corresponds in each plot.

Referring simultaneously to FIGS. 5 and 6. Consider first the time "t1" within the FIG. 6. Just prior to time "t1" the clamp drive signal is asserted (here, asserted high), and the voltage on the switch node 112 is falling, likely indicating that the electrical current in the primary circuit 102 has reversed directions as part of the resonance (e.g., electrical current $I_N$ as shown in FIG. 2C). At time "t1" the clock signal is asserted (here, asserted high), and responsive thereto the clamp control circuit 526 deactivates the clamp drive signal (making the clamp FET 118 non-conductive). Electrical current flow in the primary circuit 102, and thus voltage on the switch node 112, thus begins to drop as shown.

The main control circuit 524 is designed and constructed to assert the main drive output 560, and thus make the main FET 114 conductive, at a zero-volt switch point or zero-current switch point. However, because of parasitic capacitance in the primary circuit 102, and particularly the parasitic capacitance of the main FET 114 itself, zero-volt switching of the main FET 114 does not necessarily occur when the voltage on the switch node 112 reaches zero. Rather, zero-volt switching occurs after the parasitic capacitance (illustrated in FIG. 5 as capacitor 510) has been discharged. In the example timing diagrams of FIG. 6, peak negative voltage 608 at time "t2" is the negative voltage (and corresponding negative current) used to discharge the capacitor 510. Once discharged, the example system moves to the energy storage mode.

However, the time window for zero-volt switching is small, sometimes in the nanosecond range. Given propagation delays for signals within the controller 500, by the time a circuit directly detects the zero-volt switch point, signal propagation delays within the controller 500 make assertion of the main drive output 560 quick enough to achieve the desired zero-volt switching difficult. Thus, in some example embodiments the controller 500, and particularly the main control circuit 524, does predictive zero-volt switching. That is, in the time period between "t1" and "t2" the main control circuit 524 senses the voltage on the switch node 112 (through the voltage sense circuit 528). As the voltage on the switch node 112 falls through a predetermined voltage threshold 610 (e.g., 12 Volts), main control circuit 524 triggers the process to assert the main drive output 560, with the assertion actually occurring at the time "t2" in FIG. 6. Stated slightly different, the main control circuit 524 asserts the main drive output 560 responsive to the sense signal on the sense input 556 falling through a predetermined voltage threshold that is non-zero, and where the predetermined voltage threshold indicates that a zero-volt switching condition will occur thereafter.

Nevertheless, once the main drive output 560 is asserted (at time "t2") thus activating the main FET 114, the power converter 100 enters the energy storage mode (as discussed with respect to FIG. 2A). In the example timing diagram, the main drive signal of plot 604 is asserted between time "t2" and time "t3." The main control circuit 524 de-assets the main drive output 560 based on the feedback signal on the feedback input 558 from the secondary circuit 104. The example power converter 100 thus enters the flyback mode (as discussed with respect to FIG. 2B).

In the previous discussion of the flyback mode (with respect to FIG. 2B) the clamp FET 118 is shown conductive; however, in example systems the clamp FET 118 is made conductive a finite period of time after the main FET 114 is made non-conductive. That is, the example clamp control circuit 526 is designed and constructed to assert the clamp drive output 554, and thus make the clamp FET 118 conductive, at a zero-volt switch point or zero-current switch point. Again however, because of capacitance in the primary circuit 102, and particularly clamp capacitor 120 and the parasitic capacitance of the clamp FET 118 itself (illustrated in FIG. 5 as capacitor 512), zero-volt switching of the clamp FET 118 does not occur when the voltage on the switch node 112 reaches zero. Rather, zero-volt switching of the clamp FET 118 occurs when the voltage on the switch node 112 equals the voltage on clamp capacitor 120. Stated slightly differently, zero-volt switching of the clamp FET 118 occurs when the body diode 508 just begins to conduct during the flyback mode of the power converter 100.

However, the time window for zero-volt switching the clamp FET 118 is small, sometimes in the nanosecond range. As before, given propagation delays for signals within the controller 500, by the time a circuit directly detects the zero-volt switch point, signal propagation delays within the controller 500 make assertion of the clamp drive output 554 quick enough to achieve the desired zero-volt switching difficult. Thus, in some example embodiments the controller 500, and particularly clamp control circuit 526, does predictive zero-volt switching. That is, in the time period after "t3" the clamp control circuit 526 senses the voltage on the switch node 112 (through the voltage sense circuit 528) by way of the sense input 552. As the voltage on the switch node 112 rises through a predetermined voltage threshold 612 (e.g., 2 Volts), clamp control circuit 526 triggers the process to assert the clamp drive output 554, with the assertion actually occurring at the time "t4" in FIG. 6. Stated slightly differently, the clamp control circuit 526 asserts the clamp drive output 554 responsive to the sense signal on the sense input 552 rising through a predetermined voltage threshold that is non-zero, and where the predetermined voltage threshold indicates that a zero-volt switching condition will occur thereafter. Nevertheless, the clamp drive output 554 is asserted (at time "t4") thus activating the clamp FET 118. In the example timing diagram, the clamp drive signal of plot 602 is asserted between time "t4" and time "t6." The clamp control circuit 526 again de-asserts the clamp drive output 554 responsive to assertion of the clock signal received on the clock input 550. The resonant energy transfer mode can be said to begin when negative current is developed in the primary circuit 102, such as at time "t5" (i.e., as the voltage on the switch node 112 begins to fall).

Still referring to FIGS. 5 and 6, in example systems the modulation circuit 542 also monitors the sense signal by way of its sense input 546. The modulation circuit 542 regulates the clock period (or clock frequency being the inverse of the period) of the clock signal by modulating or changing the modulate signal driving to the modulate output 548. In steady-state conditions (e.g., steady-state load, and constant $V_{IN}$), the modulation circuit 542 achieves zero-volt switching of the main FET 114. More particularly, the modulation circuit 542 regulates the negative current flow to balance considerations of reducing magnetization and core losses in the transformer (particularly at lower loads), yet still achieving sufficient negative current to implement zero-volt switching of the main FET 114. Thus, the modulation circuit 542 controls the clock period T of the example clock signal of plot 600. For example, the modulation circuit 542 increases the frequency of the clock signal (i.e., shortens the clock period T) if the sense signal indicates excess negative current. In some example systems, the modulation circuit 542 increases the frequency of the clock signal in each cycle by an amount proportional to the excess negative current. In other cases, the modulation circuit 542 increases the frequency of the clock signal in each cycle by a predetermined amount. Related, the modulation circuit 542 decreases the clock frequency (i.e., increases the clock period T) if the sense signal indicates insufficient negative current. In some example systems, modulation circuit 542 decreases the frequency of the clock signal by an amount proportional to the insufficient negative current. In other cases, the modulation circuit 542 decreases the frequency of the clock signal by a predetermined amount.

Before turning to example circuits regarding regulation, it is noted that the example embodiments achieve the balance of reducing or minimizing magnetization and core losses in the transformer and having sufficient negative current to implement zero-volt switching of the main FET 114 in steady-state conditions; however, during periods of time when the load is changing (or the input voltage $V_{IN}$ is not steady), zero-volt switching may not occur on each and every activation of the main FET 114.

Returning to FIG. 5, regulating the negative current in accordance with example embodiments is based on the timing of the voltage on the switch node 112, as measured by example timers. Thus, in some embodiments the controller 500 includes a reference timer 562 defined on the semiconductor substrate 522. The reference timer 562 defines a trigger input 564, a reset input 566, and a timer output 568. The trigger input 564 is coupled to the clock signal, and the reset input 566 is coupled to the main drive output 560. The example controller 500 further comprises a maximum timer 570 defined on the semiconductor substrate 522. The maximum timer 570 defines a trigger input 572, a reset input 574, and a timer output 576. The trigger input 572 of the maximum timer 570 is coupled to the clock signal. The reset input 574 of the maximum timer 570 is coupled to main drive output 560.

The example timers 562 and 570 couple to the modulation circuit 542 to enable the modulation circuit 542 to regulate the negative current. In particular, the modulation circuit 542 has first timer input 578 coupled to the timer output 568 of the reference timer 562, and the modulation circuit 542 has a second timer input 580 coupled to the timer output 576 of the maximum timer 570. The example modulation circuit 542 is configured to increase the clock frequency of the oscillator if the signal indicative of negative current (i.e., the sense signal) falls below a predetermined voltage threshold (e.g., predetermined voltage threshold 610 (FIG. 6)) prior to assertion of the timer output 568 of the reference timer 562. Relatedly, in example systems the example modulation circuit 542 is configured to decrease the clock frequency of the oscillator if the signal indicative of negative current (i.e., the sense signal) falls below the predetermined voltage threshold (e.g., predetermined voltage threshold 610 (FIG. 6)) after assertion of the timer output 568 of the reference timer 562. Further, the example modulation circuit 542 is configured to make a non-linear change to the clock frequency of the oscillator if the signal indicative of negative current does not fall below the predetermined voltage threshold prior to assertion of the timer output 576 of the maximum timer 570.

Figure 7:
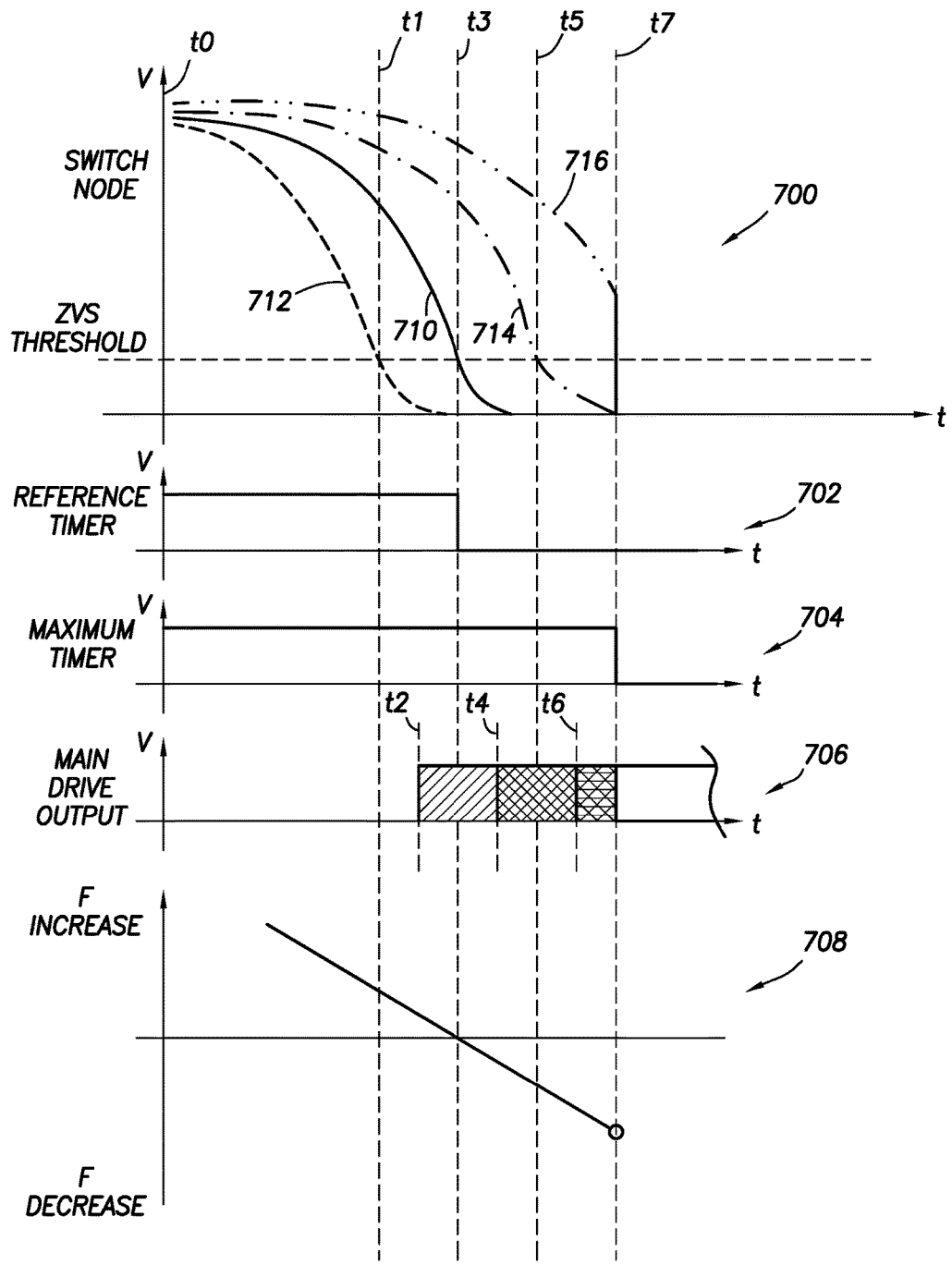
FIG. 7 shows a timing diagram with various signals in accordance with at least some embodiments.

FIG. 7 shows a timing diagram with various signals in accordance with at least some embodiments. In particular, plot 700 shows a set of co-plotted voltages on the switch node 112 as a function of time, plot 702 shows the timer output signal of the reference timer 562 (FIG. 5) as a function of time, plot 704 shows the timer output signal of the maximum timer 570 (FIG. 5) as a function of time, plot 706 shows the drive signal on the main drive output 560 as a function of time, and plot 708 shows a relationship of an amount of change of clock frequency against timing of the voltage on the switch node falling through the predetermined voltage threshold (shown as "ZVS Threshold" in FIG. 7).

Referring simultaneously to FIGS. 5 and 7, and particularly plot 700. Plot 700 shows four example voltages that may be sensed on the switch node 112 as a function of time. The solid line 710 shows switch node voltage falling as a function of time, and crossing the ZVS threshold at time "t3." For purposes of explanation, consider that the case of switch node voltage represented by solid line 710 is the ideal situation for achieving the zero-voltage switching of the main FET 114. Stated slightly differently, the case of switch node voltage represented by solid line 710 represents a situation where the clock frequency enables precisely the correct amount of negative current to enable zero-volt switching of the main FET 114. In example systems, the reference timer 562 produces the timer output signal shown by plot 702. The timer starts based on assertion of the clock signal (not shown) at "t0," and the timer expires at time "t3." A finite amount of time after the switch node voltage crosses or falls through the ZVS threshold the main drive output is asserted (at time "t4"). Thus, in the example situation the switch node voltage crosses or falls through the ZVS threshold contemporaneously with expiration of the reference timer (e.g., within a predefined window of time centered at the expiration of the reference time), and referring to plot 708, the modulation circuit 542 makes no change to the clock frequency.

Now consider the plot 700 again, and particularly dashed line 712. For purposes of explanation, consider that the case of switch node voltage represented by dashed line 712 is a situation where the negative current is too high (i.e., there is excess negative current). Because the main control circuit 524 asserts the main drive output 560 a set amount of time after the switch node voltage falls through the ZVS threshold, when the negative current is too high the main FET 114 is likely not switched at the zero-volt switch point, and likely the main FET 114 is switched with a negative voltage across the FET and its body diode 506 conducting. Stated slightly differently, the case of switch node voltage represented by dashed line 712 is a situation where the clock frequency results in switching of the main FET 114 too late to achieve zero-voltage switching. As before, the reference timer 562 produces the timer output signal shown by plot 702. The timer starts based on assertion of the clock signal (not shown) at "t0," and the timer expires at time "t3." Because the switch node voltage crossed or fell through the ZVS threshold at time "t1," the main control circuit 524 asserts the main drive output a finite time later (at time "t2"). Thus, in the example situation the switch node voltage crosses or falls through the ZVS threshold prior to expiration of the reference timer, and referring to plot 708 the modulation circuit 542 increases the frequency based on or proportional to how early the ZVS threshold was crossed relative to the expiration of the reference timer at time "t3."

Now consider the plot 700 again, and particularly dash-dot-dash line 714. For purposes of explanation, consider that the case of switch node voltage represented by dash-dot-dash line 714 is a situation where the negative current is too low (i.e., there is insufficient negative current). Because the main control circuit 524 asserts the main drive output 560 a set amount of time after the switch node voltage falls through the ZVS threshold, when the negative current is too low the main FET 114 is likely not switched at the zero-volt switch point, and likely the main FET 114 is switched with a positive voltage across the FET (i.e., the parasitic capacitance represented by capacitor 510 not fully discharged). Stated slightly differently, the case of switch node voltage represented by dash-dot-dash line 714 is a situation where the clock frequency results switching of the main FET 114 too early to achieve zero-voltage switching. As before, the reference timer 562 produces the timer output signal shown by plot 702. The timer starts based on assertion of the clock signal (not shown) at "t0," and the timer expires at time "t3." Because switch node voltage crossed or fell through the ZVS threshold at time "t5," the main control circuit 524 asserts the main drive output a finite time later (at time "t6"). Thus, in the example situation the switch node voltage crosses or falls through the ZVS threshold after expiration of the reference timer, and referring to plot 708 the modulation circuit 542 decreases the frequency based on or proportional to how late the ZVS threshold was crossed relative to the expiration of the reference timer at time "t3."

Now consider the plot 700 again, and particularly dash-dot-dot-dash line 716. For purposes of explanation, consider that the case of switch node voltage represented by dash-dot-dot-dash line 716 is a situation where the negative current is also too low (i.e., there is insufficient negative current) such that the ZVS threshold is not crossed. In this situation, the modulation circuit 542 forces the main FET 114 active at time "t7" regardless of the voltage across the FET. Stated slightly differently, the case of switch node voltage represented by dash-dot-dot-dash line 716 is a situation where the clock frequency is so far askew that to maintain output voltage the controller 500 forces the primary circuit 102 back into energy storage mode. The maximum timer 570 controls this case, and produces the timer output signal shown by plot 704. The maximum timer 570 starts based on assertion of the clock signal (not shown) at "t0," and the maximum timer expires at time "t7." Because switch node voltage failed to cross the ZVS threshold by time "t7," the main control circuit 524 asserts the main drive output 560. Referring to plot 708, in the situation where the switch node voltage fails to cross the ZVS threshold, the modulation circuit 542 makes a non-linear change to the clock frequency.

The various embodiments discussed with respect to FIG. 7 make changes to the clock frequency based on how long before or after the switch node voltage falls through the ZVS threshold relative to the reference timer 562. However, other parameters may be used to control an amount the clock frequency is changed. Returning to FIG. 5, as previously discussed, in some cases the voltage sense circuit 528 couples to the node between the main FET 114 and the sense resistor 116. During periods of time when the main FET 114 is conducting, the voltage on the sense resistor is indicative of current flow through the main FET 114. During periods of time when the main FET 114 is non-conducting and the body diode 506 is reversed biased by the voltage on the switch node 112, the voltage on the sense resistor 506 is effectively ground or common. However, during periods of time when there is negative current in the primary circuit 102, once the parasitic capacitance represented by capacitor 510 is discharged, the negative voltage on the switch node 112 can forward bias the body diode 506, thus resulting in small negative voltages on the sense resistor 116. In accordance with alternative embodiments, in addition to or in place of making changes to the clock frequency proportional to how long before or after the switch node voltage falls through the ZVS threshold relative to the reference timer 562, the further example systems modulate based on voltage sensed on the sense resistor 116. For example, the modulation circuit 542 may make changes to the clock frequency based on the peak negative voltage sensed at the sense resistor 116 (with negative voltage indicative of the body diode 506 of the main FET 114 being forward biased). If the peak negative voltage is too high, the modulation circuit 542 increases the frequency. If the peak negative voltage is too low (or the voltage fails to go negative), the modulation circuit 542 decreases the frequency.

Other example methods and systems may be used to sense a signal indicative of current flow (particularly negative current flow) through the primary winding. For example, the clamp FET 118 may be a SENSEFET brand product available from ON Semiconductor, where the clamp FET includes a second FET on the same substrate whose conducted current is a small fraction of, but proportional to, the current through the primary FET. In other cases, the flyback transformer 106 may include one or more sense windings magnetically coupled to the core, and thus voltage on the sense winding, or current measured as flowing through the sense winding, may be a signal indicative of current flow in the primary winding.

Figure 8:
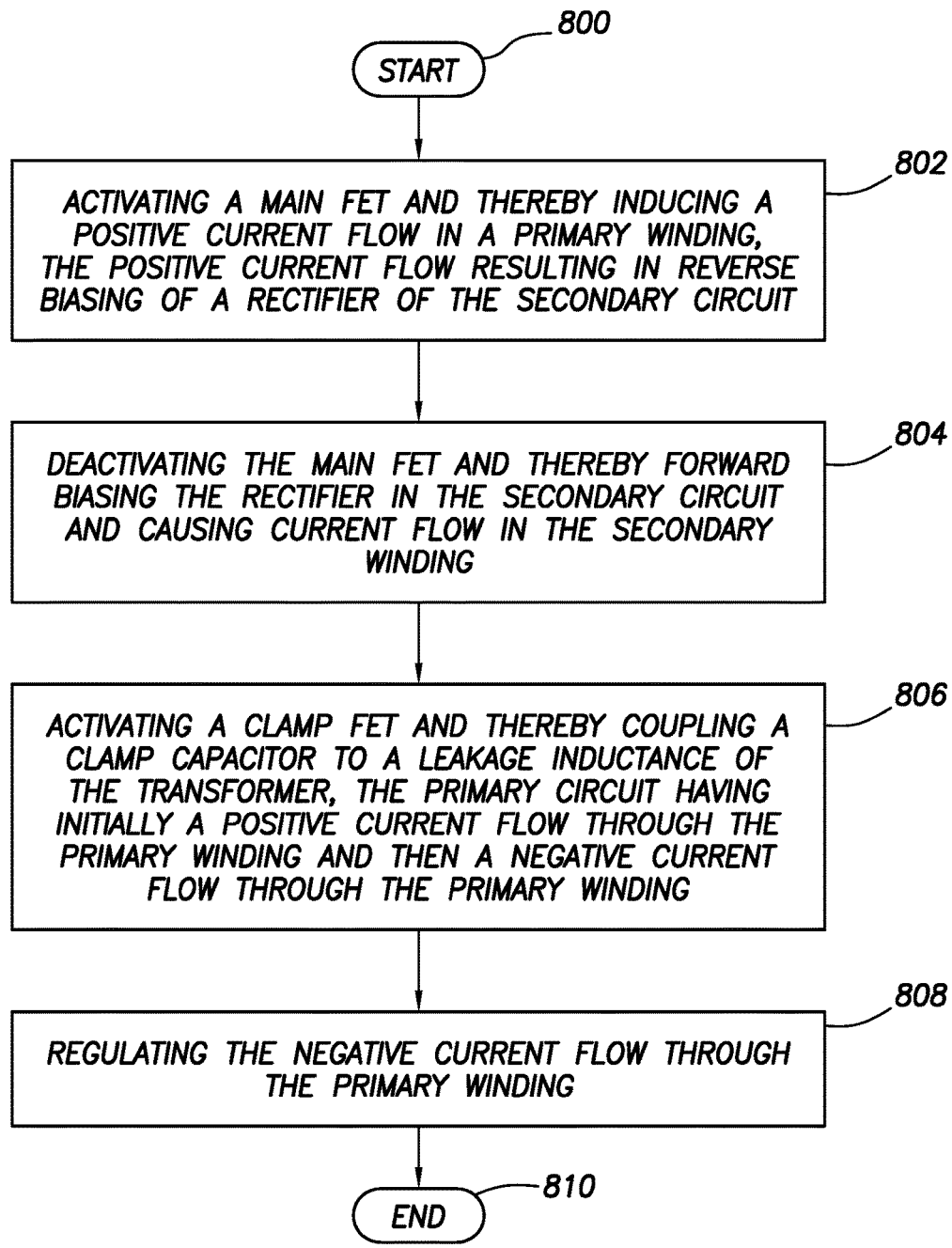
FIG. 8 shows a method in accordance with at least some embodiments

FIG. 8 shows a method in accordance with at least some embodiments. In particular, the method starts (block 800) and comprises: activating a main FET and thereby inducing positive current flow in a primary winding, the positive current flow resulting in reverse biasing of a rectifier of the secondary circuit (block 802); deactivating the main FET and thereby forward biasing the rectifier in the secondary circuit and causing current flow in the secondary winding (bock 804); activating a clamp FET and thereby coupling a clamp capacitor to a leakage inductance of the transformer, the primary circuit having initially positive current flow through the primary winding and then at least some negative current flow through the primary winding (block 806); and regulating the negative current flow through the primary winding (block 808). Thereafter the method ends (block 810).

The above discussion is meant to be illustrative of the principles and various embodiments of the present invention. Numerous variations and modifications will become apparent to those skilled in the art once the above disclosure is fully appreciated. For example, the asserted state for various signals within the specification was discussed as asserted with a higher voltage; however, one of ordinary skill in the art, with the benefit of this disclosure, would understand that various signals can be likewise asserted low (with corresponding hardware changes and additions) without changing the principles of operation of the example embodiments. Moreover, while in the example circuit of FIG. 6 $V_{OUT}$ is measured in the secondary circuit, in other example systems the $V_{OUT}$ may be indirectly measured, such as by measuring voltage by way of a sense winding magnetically coupled to both the primary winding and secondary winding. Similarly, the signal indicative of negative current flow through the primary winding may be monitored or measured in any suitable form, such as: monitoring voltage on the sense winding of the transformer; measuring current flow in the sense winding of the transformer by way of a current sensor. It is intended that the following claims be interpreted to embrace all such variations and modifications.

What is claimed is:

1. A method of operation a power converter, comprising:
    activating a main switch of a primary circuit of an active-camp flyback power converter, and thereby inducing a positive current flow in a primary winding of a transformer, the positive current flow resulting in reverse biasing of an active or passive rectifier of a secondary circuit;
    deactivating the main switch and thereby forward biasing the rectifier in the secondary circuit and causing current flow in a secondary winding of the secondary circuit;
    activating a clamp switch of the primary circuit, and thereby coupling a clamp capacitor to a leakage inductance of the transformer, the primary circuit having initially a positive current flow through the primary winding and then a negative current flow through the primary winding; and
    regulating the negative current flow through the primary winding by changing a frequency of an oscillator providing a clock signal to de-activate the clamp switch, the changing responsive to a signal indicative of negative current flow during periods of time when both the main switch and the clamp switch are deactivated.

2. The method of claim 1 wherein changing the frequency of the oscillator further comprises increasing the frequency of the oscillator if the signal indicative of negative current flow indicates an excess negative current.

3. The method of claim 2 wherein increasing the frequency of the oscillator further comprises at least one selected from a group comprising: increasing the frequency by an amount proportional to the excess negative current; and increasing the frequency by a predetermined amount.

4. The method of claim 1 wherein changing the frequency of the oscillator further comprises decreasing the frequency of the oscillator if the signal indicative of negative current flow indicates an insufficient negative current.

5. The method of claim 4 wherein decreasing the frequency of the oscillator further comprises at least one selected from a group comprising: decreasing the frequency by an amount proportional to the insufficient negative current; and decreasing the frequency by a predetermined amount.

6. The method of claim 1 wherein changing the frequency of the oscillator further comprises:
    activating a timer responsive to deactivating the clamp switch; and
    increasing the frequency of the oscillator if the signal indicative of negative current flow falls below a predetermined threshold prior to expiration of the timer.

7. The method of claim 1 wherein changing the frequency of the oscillator further comprises:
    activating a timer responsive to deactivating the clamp switch; and
    decreasing the frequency of the oscillator if the signal indicative of negative current flow falls below a predetermined threshold after expiration of the timer.

8. The method of claim 1 further comprising monitoring the signal indicative of negative current flow through the primary winding by at least one selected from a group comprising:
    monitoring voltage at a switch node between the primary winding and the main switch;
    measuring current flow in a primary loop between the primary winding and the clamp capacitor;
    monitoring voltage at a sense node between the main switch and a sensor resistor coupled to ground or common;
    measuring current flow in a sense transistor of the clamp switch.

9. A method of operation a power converter, comprising:
    activating a main switch of a primary circuit of an active-clamp flyback power converter, and thereby inducing a positive current flow in a primary winding of a transformer, the positive current flow resulting in reverse biasing of an active or passive rectifier of a secondary circuit;
    deactivating the main switch and thereby forward biasing the rectifier in the secondary circuit and causing current flow in a secondary winding of the secondary circuit;
    activating a clamp electrically controlled switch of the primary circuit, and thereby coupling a clamp capacitor to a leakage inductance of the transformer, the primary circuit having initially a positive current flow through the primary winding and then a negative current flow through the primary winding; and
    regulating the negative current flow through the primary winding by:
        deactivating the clamp FET;
        activating a timer responsive to deactivating the clamp FET;
        monitoring a signal indicative of negative current flow through the primary winding; and if the signal indicative of negative current flow does not fall below a predetermined threshold prior to expiration of the timer
        activating the main FET; and
        making a non-linear change of frequency of an oscillator providing a clock signal.

10. A semiconductor device for controlling an active clamp flyback power converter, the semiconductor device comprising:
    a substrate of semiconductor material;
    an oscillator defined on the substrate, the oscillator has a clock output and a modulate input, the oscillator configured to generate a clock signal at a clock frequency on the clock output based on a modulate signal received on the modulate input;

a voltage sense circuit defined on the substrate, the voltage sense circuit has a sense input and a sense output, the sense input configured to couple to a signal indicative of current flow through a primary winding of a transformer of the power converter, and the voltage sense circuit configured to generate a sense signal on the sense output;

a modulation circuit defined on the substrate, the modulation circuit has a clock input, a sense input, and a modulate output, the clock input coupled to the clock signal, the sense input coupled to the sense signal, and the modulate output coupled to the modulate input of the oscillator;

a clamp control circuit defined on the substrate, the clamp control circuit has a clock input, a sense input, and a clamp drive output, the clock input of the clamp control circuit coupled to the clock signal, the sense input of the clamp control circuit coupled to the sense signal, and the clamp drive output configured to couple to a gate of a clamp field effect transistor (FET) of the power converter;

a main control circuit defined on the substrate, the main control circuit has a sense input, a feedback input, and a main drive output, the sense input of the main control circuit coupled to the sense signal, the feedback input configured to couple to a feedback signal from a secondary side of the power converter, and the main drive output configured to couple to a gate of a main FET of the power converter;

the main control circuit is configured to assert the main drive output responsive to the sense signal falling through a first predetermined threshold, and the main control circuit further configured to de-assert the main drive output based on the feedback signal;

the clamp control circuit is configured to assert the clamp drive output responsive to the sense signal rising through a second predetermined threshold after the main drive output is de-asserted, and the clamp control circuit further configured to de-assert the clamp drive output responsive to assertion of the clock signal; and the modulation circuit is configured to monitor the sense signal, and configured to regulate the clock frequency of the clock signal by changing the modulate signal driven to the modulate output based on the sense signal.

11. The system of claim 10 wherein when the modulation circuit regulates the clock frequency, the modulation circuit is configured to increase the frequency of the clock signal if the sense signal indicates an excess negative current.

12. The system of claim 11 wherein when the modulation circuit increases the frequency of the clock signal, the modulation circuit is configured to increase the frequency of the clock signal by at least one selected from a group comprising: increase the frequency by an amount proportional to the excess negative current; and increase the frequency of the clock signal by a predetermined amount.

13. The system of claim 11 wherein when the modulation circuit regulates the clock frequency, the modulation circuit is further configured to decrease the clock frequency if the sense signal indicates an insufficient negative current.

14. The system of claim 12 wherein when the modulation circuit deceases the frequency of the clock signal, the modulation circuit is configured to decrease the frequency of the clock signal by at least one selected from a group comprising:

decrease the clock frequency by an amount proportional to the insufficient negative current; and decrease the frequency of the clock signal by a predetermined amount.

15. The system of claim 10 further comprising:

a first timer defined on the substrate, the first timer has a trigger input, a reset input, and a timer output, the trigger input is coupled to the clock signal, and the reset input is coupled to the main drive output; and the modulation circuit has a first timer input coupled to the timer output of the first timer;

wherein when the modulation circuit regulates the clock frequency, the modulation circuit is configured to increase the clock frequency of the oscillator if the signal indicative of negative current through the primary winding falls below a predetermined threshold prior to assertion of the timer output of the first timer.

16. The system of claim 15 wherein when the modulation circuit regulates the clock frequency, the modulation circuit is configured to decrease the clock frequency of the oscillator if the signal indicative of negative current through the primary winding falls below the predetermined threshold after assertion of the timer output of the first timer.

17. The system of claim 10 wherein the sense input of the voltage sense circuit is configured to couple to at least one selected from a group comprising:

a switch node between the primary winding and the main FET;

a current measuring device configured to measure current flow between the primary winding and the clamp capacitor;

a sense node between the main FET and a sensor resistor coupled to ground or common;

a sense transistor of the clamp FET;and a sense winding of a flyback transformer.

18. The system of claim 10 further comprising:

a second timer defined on the substrate, the second timer has a trigger input, a reset input, and a timer output, the trigger input of the second timer is coupled to the clock signal, and the reset input of the second timer is coupled to the main drive output;

the modulation circuit has a second timer input coupled to the timer output of the second timer;

wherein when the modulation circuit regulates the clock frequency, the modulation circuit is configured to make a non-linear change to the clock frequency of the oscillator if the signal indicative of negative current flow through the primary does not fall below a predetermined threshold prior to assertion of the timer output of the second timer.

19. An active clamp flyback power converter comprising:

a primary circuit comprising:

a primary winding of a flyback transformer having a first terminal coupled to an input node, and a second terminal defining a switch node;

a main field effect transistor (FET) coupled between the switch node and a ground or common of the primary circuit;

a clamp FET in series with a clamp capacitor, the clamp FET and clamp capacitor coupled between the input node and the switch node;

a secondary circuit comprising:

a secondary winding of the flyback transformer; and a rectifier coupled between a terminal of the secondary winding and ground or common of the secondary circuit;

a controller defining a main drive output coupled to a gate of the main FET, a clamp drive output coupled to a gate of the clamp FET, and a current sense input coupled to the primary circuit;

the controller is configured to:
- activate the main FET and thereby induce a positive current flow in the primary winding, the positive current flow resulting in reverse biasing of the rectifier of the secondary circuit;
- deactivate the main FET and thereby forward bias the rectifier in the secondary circuit and cause current flow in the secondary winding;
- activate the clamp FET and thereby couple the clamp capacitor to a leakage inductance of the flyback transformer, the primary circuit having initially a positive current flow through the primary winding and then a negative current flow through the primary winding; and
- regulate the negative current flow through the primary winding by changing a frequency of an oscillator providing a clock signal to de-activate the clamp FET, the changing responsive to a signal indicative of negative current flow during periods of time when both the main FET and the clamp FET are deactivated.

* * * * *

UNITED STATES PATENT AND TRADEMARK OFFICE
CERTIFICATE OF CORRECTION

PATENT NO. : 10,312,817 B2
APPLICATION NO. : 15/964620
DATED : June 4, 2019
INVENTOR(S) : Ajay Karthik Hari and Bryan Wayne McCoy It is certified that error appears in the above-identified patent and that said Letters Patent is hereby corrected as shown below:

In the Claims

Column 15
Claim 1, Line 31, "active-camp" should be --active-clamp--
Claim 1, Lines 40-41, "induclance" should be --inductance--

Signed and Sealed this
Seventeenth Day of December, 2019

Andrei Iancu
*Director of the United States Patent and Trademark Office*